May 3, 1960
R. A. CELLITTI ET AL
2,935,213
FORK LIFT VEHICLE WEIGHING SCALE
Filed Dec. 19, 1958
3 Sheets-Sheet 1
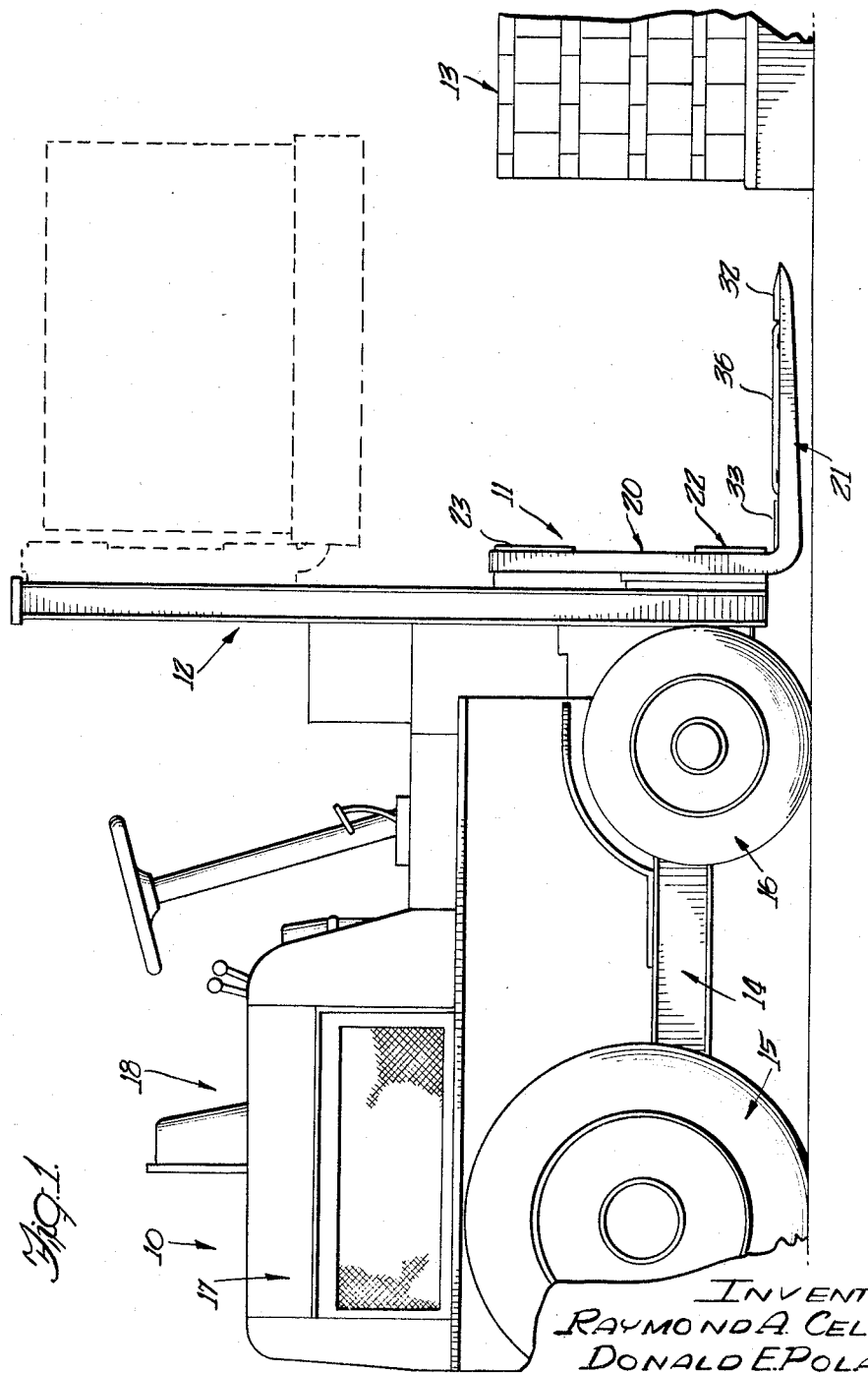

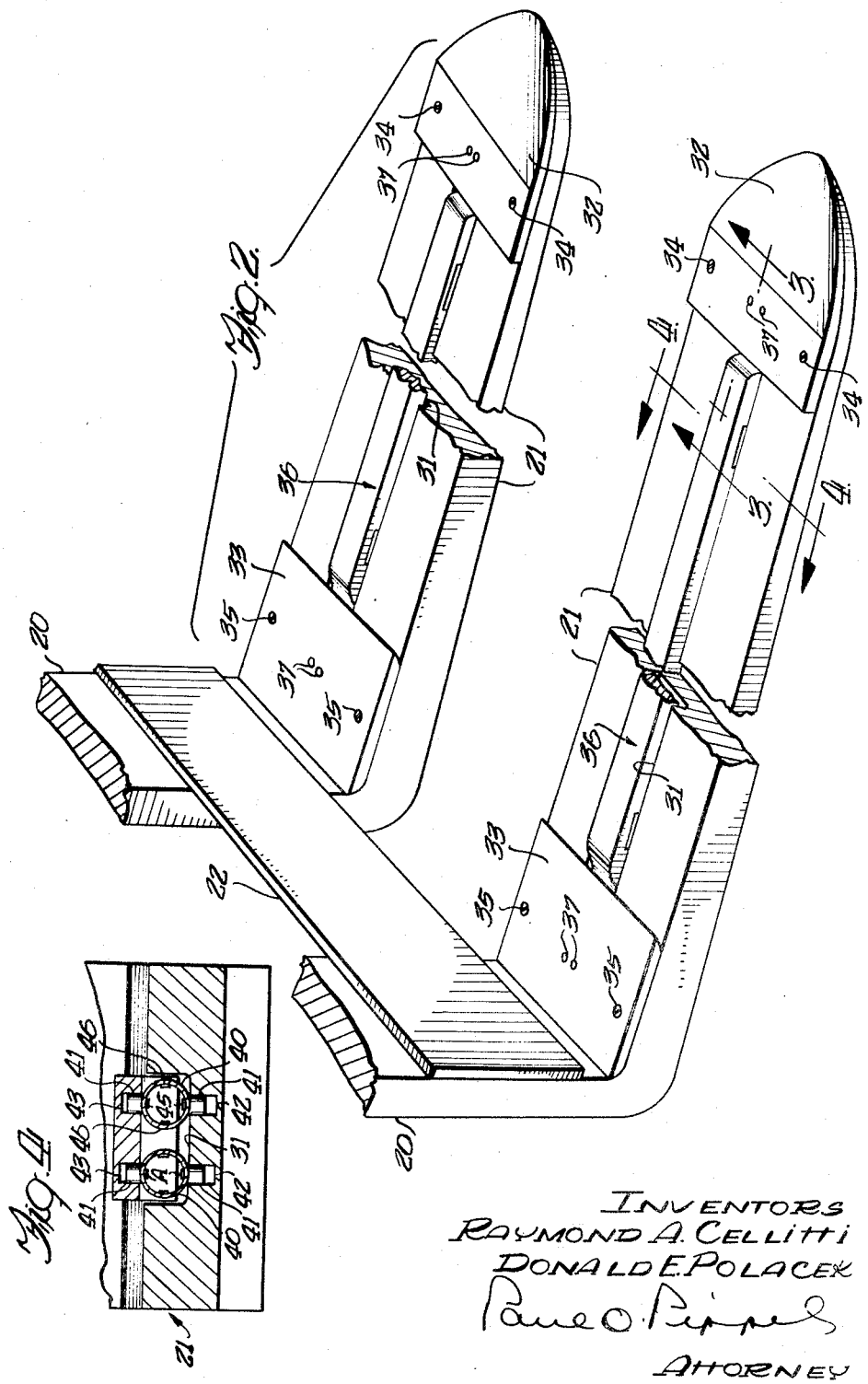

May 3, 1960
R. A. CELLITTI ET AL
2,935,213
FORK LIFT VEHICLE WEIGHING SCALE
Filed Dec. 19, 1958
3 Sheets-Sheet 3
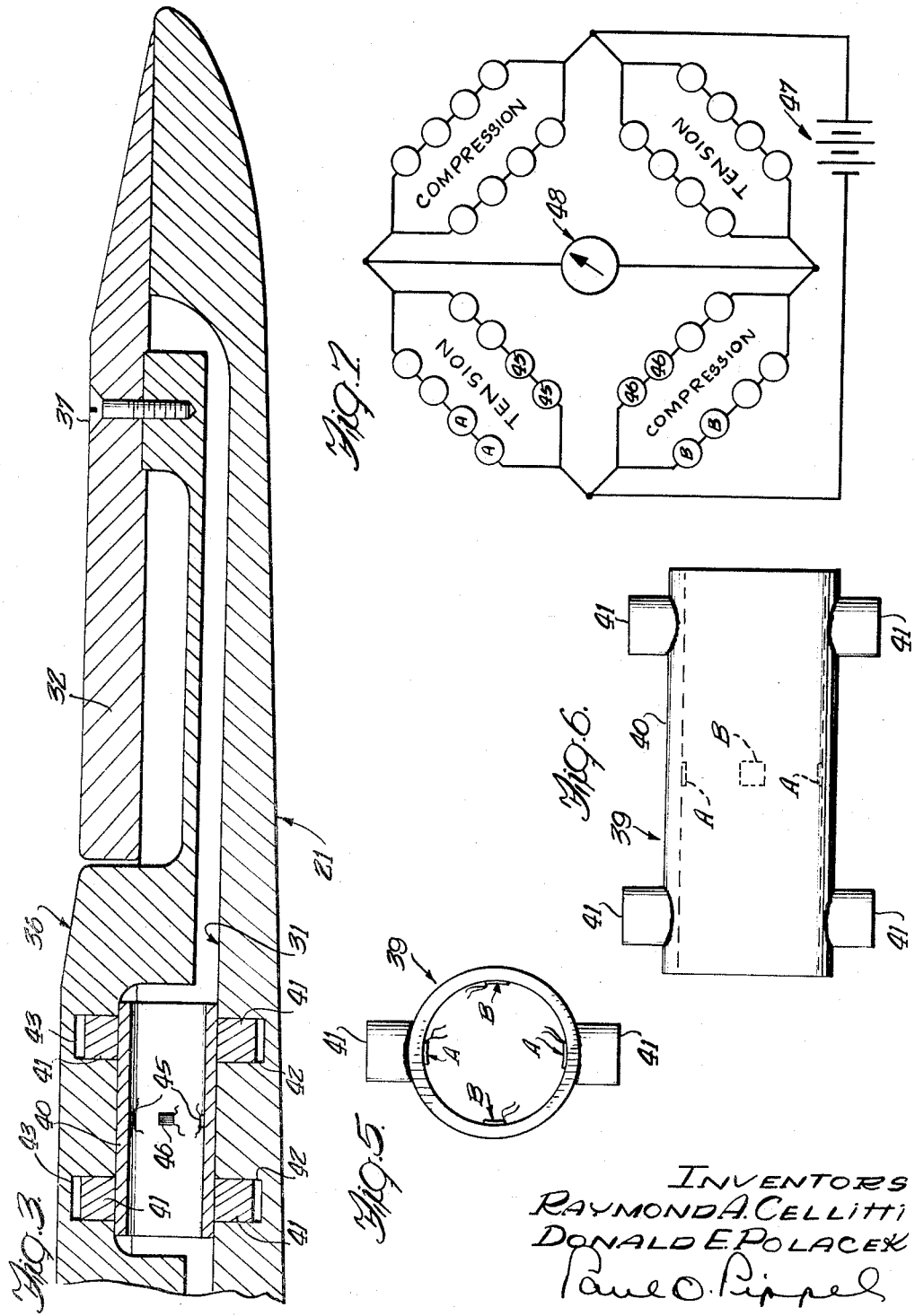
INVENTORS
RAYMOND A. CELLITTI
DONALD E. POLACEK
Paul O. Pippel
ATTORNEY United States Patent Office 2,935,213
Patented May 3, 1960

2,935,213

FORK LIFT VEHICLE WEIGHING SCALE

Raymond A. Cellitti, Hinsdale, and Donald E. Polacek, South Holland, Ill., assignors to International Harvester Company, Chicago, Ill., a corporation of New Jersey Application December 19, 1958, Serial No. 781,730

5 Claims. (Cl. 214—2)

This invention relates generally to fork lift type loading vehicles, and more specifically to a fork lift type vehicle having an improved weighing scale formed as an integral part thereof.

It has been recognized in this art that it is desirable that fork lift type vehicles used in certain material handling operations be equipped or provided with a weighing scale so that any load to be carried by the vehicle can be weighed thereon without the necessity for first transferring the load to an independent weighing scale. A number of weighing scales for use on fork lift type vehicles have been developed in the art, however, each has to a greater or lesser degree certain disadvantages which are generally due either to their complexity or inaccuracy unless used under certain ideal conditions.

It is the object of the present invention to provide a weighing scale arrangement which is particularly adapted for construction as an integral part of a fork lift type vehicle and which has high accuracy in operation under substantially all conditions of operation of the vehicle.

It is another object of the present invention to provide a relatively simple weighing scale carried in the tines of a fork type lift vehicle which will provide for accurate weight measurements of any load disposed upon the tines of the fork lift type vehicle and which will not interfere with the normal intended uses of such vehicles.

It is a further object of the present invention to provide a weighing scale using strain gage networks carried in certain load cells disposed in the tines of a fork type lift vehicle and cooperating with a certain lever or bar and plate construction to measure the weight of any load carried on the tines of the fork lift type vehicle.

Other objects and features of this invention will be apparent upon a perusal of the following specification and drawings of which:

Figure 1 is a side elevational view of a fork lift type vehicle including the weighing scale of the present invention;

Figure 2 is an enlarged isometric view of a portion of the fork of the vehicle shown in Figure 1;

Figure 3 is an enlarged cross sectional view of one of the tines shown in Figure 2 and taken along the line 3—3 of Figure 2;

Figure 4 is an enlarged cross sectional view of one of the tines shown in Figure 2 and taken along the line 4—4 of Figure 2;

Figure 5 is an enlarged end view of one of the load cells forming a part of the present invention;

Figure 6 is a side view of the assembly shown in Figure 5; and

Figure 7 is a diagrammatic view of the electrical circuits for the present invention.

The present embodiment is the preferred embodiment but it is to be understood that changes can be made in the present embodiment by one skilled in the art without departing from the spirit and scope of the present invention.

For a general description of the present invention, reference is made to the drawings. The vehicle 10 is provided with a suitable source of power for propelling the vehicle and for raising and lowering the fork 11. The fork 11 is slidably carried on a mast structure 12, and means (not shown) are provided for raising and lowering the fork 11 on the mast 12. The fork 11 is provided with two horizontally projecting tines 21 which are engageable with the underside of a load such as 13 by a forward movement of the vehicle 10. When the fork 11 is raised, the load 13 is carried on the tines thereof. Each of the tines 21 is provided with a suitable bar or plate 36 carried longitudinally therein and having its central portion extending slightly above the end portions of the tines 21. The bars are secured at their end portions within the tines 21 and at their central portions are carried on load cell assemblies which, in turn, are carried in depressions in the tines. Four load cell assemblies, each having four strain gages, are provided and are connected into a network or electrical bridge which, in turn, is connected to a source of electrical potential and a meter. Any load carried on the fork 11 will rest upon the noted bars and will exert a force upon the load cell assemblies which will be proportional to the weight of the load. The electrical circuits connected to the strain gages will translate the forces upon the tines into a reading on the meter. The meter is calibrated in terms of weight and is disposed within the operator's compartment of the vehicle 10 so that the operator of the vehicle may easily read the weight of any load carried by the fork 11. The present invention has many advantages over prior known constructions. It is immaterial that the loading on the tines be greater at one portion thereof than another as the strain gage network will accurately measure the weight of any load irrespective of the loading pattern. Because of the specific arrangement and construction of the bars and load cells in the tines of the fork lift type truck, errors caused by frictional forces between the various elements, such as is common in other fork lift type vehicle weighing scales is absent. The specific scale arrangement of the present invention also provides for a minimum of interference with the normal load-working operations of fork lift type vehicles.

Turning next to a detailed description of the present invention, reference is again made to the drawings. The fork lift type vehicle 10 comprises a frame 14 supported by wheels 15 and 16 and is provided at the rearward end with an engine compartment 17, and an operator's compartment 18 disposed forwardly thereof. The mast or boom 12 is carried on the forward end of the frame 14 of the vehicle 10 and extends in a vertical direction. The fork assembly 11 is movably carried on the mast 12 for sliding movement relative thereto in a vertical direction. Any power means (not shown) commonly known in the art is carried by the vehicle 10 and connected to the fork assembly 11 for raising and lowering the fork 11 on the mast 12.

The fork assembly 11 comprises two L-shaped fork arms each having an upright section 20 and a tine 21. The upright sections 20 are secured in a horizontally spaced apart relationship by a pair of cross members 22 and 23. Each of the tines 21 is identical in construction and therefore only one need to be here described in detail. The tine 21 is tapered in a vertical plane, being somewhat thicker at the rearward end than the tip thereof. The tip of the tine 21 is curved to a point to facilitate the sliding thereof under a load. The tine 21 is provided with a depression 31 disposed in the upper surface and longitudinally thereof. Each end of the tine 21 is provided with a bearing plate, front bearing plate 32 and rear bearing plate 33. Front bearing plate 32 is formed with the same curvature as the tine 21 and covers the forward portion of the depression 30 as may be seen in Figure 3. The front bearing plate 32 is secured to the tine 21 by the fasteners 34. The rear bearing plate 33 is shaped to conform to the shape of the rearward end of the tine 21 and covers the rear portion of the depression 31 in a manner similar to that shown in Figure 3 for the forward bearing plate 32. The rear bearing plate 33 is secured to the tine 21 by fasteners 35.

The bar 36 for the weighing scale has a width substantially equal to the width of the depression 31, has a raised portion intermediate its ends of a length substantially equal to the distance between the bearing plates 32 and 33, and has a reduced section adjacent to each end of the central raised portion. The reduced sections have a thickness which is a small fraction of the width of the reduced section. The bar 36 is disposed within the depression 31 and each end of the bar 36 is respectively secured to the front bearing plate 32 and the rear bearing plate 33 on the underside thereof substantially adjacent the forward and rearward ends of the depression 31 by fasteners 37. Because of the thickness of the raised central portion of the bar 36, substantially no deflection of that portion will occur due to any loads imposed upon the bar 36. The central raised portion of the bar 36 extends slightly above the plane including the bearing plates 32 and 33. The reduced portions of the bar 36 permit deflection of the central raised portion in a vertical plane but prevent any movement or deflection thereof in a horizontal plane.

Four load cell assemblies 39, such as shown in Figures 5 and 6, are provided for the bar 36. Each load cell assembly 39 comprises a cylindrical member 40, four pins 41, and four strain gages. The pins 41 are secured to the outer surface of the cylindrical member 40 by means such as welding to provide an integral assembly. The pins 41 are positioned in pairs on said member 40 at each end thereof and with each pair or group of pins axially positioned on the same diameter of member 40.

Holes 42 are formed within the bottom wall of the depression 31 and are positioned in two groups of four holes. Each group of four holes 42 provides for the positioning of two of the pins 41 of two load cells 39 therein with the load cells 39 disposed in a side-by-side relationship longitudinally of the tine 21 as may be seen in Figures 3 and 4. The upwardly extending four pins 41 of each pair of load cells 39 are positioned in four holes 43 provided in the underside of the centrally raised portion of the bar 36. The holes 42 and 43 are of a depth greater than the height of the pins 41 so that the cylindrical members 40 are in direct contact with the bottom wall of the depressions 31 of the tines 21 and the underside of the raised portions of the bars 36. This arrangement of load cells in the tines 21 and with the bars 36 provides substantial rigidity to the entire assembly, preventing any lateral or horizontal sliding movement of the bars 36 relative to the tines 21, while permitting vertical movement of the central portion of the bars 36 relative to the tines 21.

Any load upon the fork assembly 11 will exert a force upon the bars 36 which in turn will exert a force upon the cylindrical members 40 and the total force upon the eight cylindrical members 40 will be proportional to the load upon the fork assembly 11. The loading forces upon the cylindrical members 40 will produce tension forces in the upper and lower walls of the inner surface of the cylindrical members 40 and will produce compression forces in the side walls of the inner surface of the cylindrical members 40.

Each of the cylindrical members 40 is provided with four strain gages. These strain gages may be any of those known assemblies of resistance wire which will produce a change in resistance in proportion to changes in physical length. In the strain gage arrangement shown in Figures 5 and 6, the two strain gages which respond to the tension forces on the cylindrical members 40 by an increase in length have been designated with the character A. Those strain gage assemblies which are compressed by the compression forces in the inner surface of the cylindrical members 40 are designated with the character B. For purposes of explanation, it is assumed that the load cell particularly designated with the characters A and B in Figures 5 and 6 is the one similarly designated in Figure 4. The strain gages of the adjacent load cell are designated with the numerals 45 for those in tension and 46 for those in compression.

Turning next to the electrical diagram shown in Figure 7, it may be seen that the 32 strain gages of the present invention are connected in the form of a Wheatstone bridge. The two legs on each side of the bridge include the strain gages of one of the tines 21, and one of those legs has all of the strain gages of that tine which are in tension while the other leg includes all of the strain gages which are in compression. The strain gages at one end which are in tension are connected in parallel with the strain gages which are in tension at the other end of the tine 21. The same is true of the strain gages at each end of one of the tines 21 which are in compression. A source of electrical potential 47 is connected between the tension and compression strain gages of one tine 21 and the tension and compression strain gages of the other tine 21. A meter 48 calibrated in terms of weight is connected across each pair of legs of the bridge for each tine 21. This arrangement of the strain gages in the electrical circuits produces a summation of the changes in resistance of each of the strain gages responsive to loads upon the tines 21 so that the position of the load relative to the individual load cells 39 will have no effect upon the calibration of the system. Once the meter 48 is set to a zero weight reading for no load upon the tines 21, any load placed thereon will cause a variation in the voltage drop across each leg of the bridge to produce a weight reading on the meter 48 corresponding to the weight of the load upon the tines 21. With the meter 48 carried in the operator's compartment of the vehicle, it is merely necessary that the operator insert the tines 21 of the fork assembly 11 under a load and thereafter raise the fork assembly 11 until the load is fully carried on the bars 36 of the fork assembly 11, and read the weight of the load on the meter 48. The weighing scale construction of the invention provides substantially no interference in the normal operations of the vehicle in its load carrying functions because of the specific construction of the load cells 39 within the tines 21 of the fork assembly 11 and with the described construction of the bars 36.

Having described the invention, what is considered new and desired to be protected by Letters Patent is:

1. In a fork lift type vehicle, a fork assembly for carrying a load thereupon, said fork assembly comprising a pair of substantially horizontally extending tines, each of said tines having a depression formed in the upper surface thereof longitudinally thereof, each end portion of each of said tines having a plate secured on the upper surface thereof and covering the end portion of said depression, a bar being formed to have end portions flexible only in one direction, each of said bars carried in said depressions in said tines and being secured at their ends to the under side of said plates so that said bars are substantially flexible only in a vertical direction, each of said bars having a central portion which is formed to extend above said plates so that any load carried on said fork assembly results in a downward deflection of said bars, a plurality of load cells carried in said depressions below said bars so that any load upon said fork assembly causes a force to be applied through said load cells to said tines, said load cells comprising a member carrying a plurality of strain gages so that said certain of said strain gages are placed in compression and certain of said strain gages are placed in tension by loads carried on said fork assembly, and a calibrated electrical bridge interconnecting said strain gages and operating to indicate the weight of any load upon said fork assembly.

2. In a fork lift type vehicle, a fork assembly for carrying a load thereupon, said fork assembly comprising a pair of substantially horizontally extending tines, each of said tines having a depression formed therein longitudinally thereof, the longitudinally central portions of said depressions being upwardly open and the longitudinal end portions of said depressions being covered, a pluraltiy of load cells having strain gages bonded thereto, said load cells positioned in the longitudinal central portions of said depressions in a certain spaced relationship, a pair of bars, each of said bars positioned over said load cells with the longitudinally central portions thereof partially disposed within said longitudinal central portions of said depressions so that any load upon said longitudinal central portions of said bars causes a force to be applied through said load cells to said tines, and with the longitudinal end portions of said bars disposed within the covered end portions of said depressions, means securing the ends of said bars to the underside of the covered end portions of said depressions, and electrical circuit and meter means connected to said strain gages and operating to indicate the weight of any load upon said fork assembly.

3. In a fork lift type vehicle as claimed in claim 2, wherein the end portions of said bars have a small thickness relative to the horizontal width thereof so that said bars are substantially flexible in a vertical direction relative to a horizontal direction.

4. In a fork lift type vehicle, a fork assembly for carrying a load thereupon, said fork assembly comprising a pair of substantially horizontally extending tines, each of said tines having a depression formed in the upper surface thereof longitudinally thereof, a plurality of load cells, each of said load cells comprising a cylindrical member having a plurality of strain gages bonded to the inner walls thereof, each of said cylindrical members being formed to have a pair of pins secured on each end thereof, each pair of pins being disposed along the same diameter, a plurality of holes in the bottom wall of said depressions in said tines, each of said plurality of holes having a diameter substantially equal to the diameter of said pins, each of said load cells positioned within said depressions with the pins on one side thereof positioned in said holes, a pair of bars, each of said bars having holes formed in the surface on the underside thereof, each of said holes in said bars being of a diameter substantially equal to the diameter of said pins, each of said bars being positioned over said load cells with the pins on the upper side thereof positioned in said holes in said bars, means securing the end portions of said bars to said tines, each of said bars being formed in the portions thereof adjacent the end portions secured to said tines of a substantially reduced vertical thickness relative to the horizontal width thereof so that the portions of said bars between said reduced sections are substantially freely movable upwardly and downwardly and substantially restrained from any movement horizontally, and electrical circuit and meter means connected to said strain gages and operating to indicate the weight of any load upon said fork assembly.

5. In a fork lift type vehicle, a fork assembly for carrying a load thereupon, said fork assembly comprising a pair of substantially horizontally extending tines, each of said tines having a depression formed in the upper surface thereof longitudinally thereof, four pairs of load cells, each of said load cells comprising a cylindrical member having a plurality of strain gages bonded to the inner walls thereof, each of said cylindrical members being formed to have a pair of pins secured on each end thereof, each pair of pins being disposed along the same diameter, two pairs of holes formed in the bottom wall of said depressions adjacent each end of each depression, each of said pair of holes positioned in a longitudinal side-by-side spaced apart arrangement to another pair of said holes, each of said plurality of holes having a diameter substantially equal to the diameter of said pins, each of said load cells positioned within said depressions with the pins on one side thereof positioned in one pair of said holes, a pair of bars, each of said bars having holes formed in the surface on the underside thereof, each of said holes in said bars being of a diameter substantially equal to the diameter of said pins and spaced to conform to the spacing of said load cells in said depressions, each of said bars being positioned over said load cells with the pins on the upper side thereof positioned in said holes in said bars, said holes in said depression and said holes in said bar being formed of a depth greater than the length of said pins so that said cylindrical members are in direct contact with the bottom wall of said depressions and the underside of said bars, means securing the end portions of said bars to said tines, and electrical circuit and meter means connected to said strain gages and operating to indicate the weight of any load upon said fork assembly.

References Cited in the file of this patent

UNITED STATES PATENTS

| | | |
|---|---|---|
| 2,576,417 | Ruge | Nov. 27, 1951 |
| 2,638,336 | Wetsel | May 12, 1953 |
| 2,757,923 | Lefsheik | Aug. 7, 1956 |
| 2,822,095 | Buchingham | Feb. 4, 1958 |